US011138562B2

(12) United States Patent
Selvaraju et al.

(10) Patent No.: US 11,138,562 B2
(45) Date of Patent: Oct. 5, 2021

(54) AUTOMATIC PROCESSING OF DEVICE DAMAGE CLAIMS USING ARTIFICIAL INTELLIGENCE

(71) Applicant: Dell Products L.P., Round Rock, TX (US)

(72) Inventors: Devipriya Selvaraju, Bangalore (IN); Bijan Kumar Mohanty, Austin, TX (US); Dhamodharan Duraisamy, Erode (IN); Brajesh Chandra Yadav, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 16/745,541

(22) Filed: Jan. 17, 2020

(65) Prior Publication Data

US 2021/0224744 A1 Jul. 22, 2021

(51) Int. Cl.

*G06Q 40/08* (2012.01)
*G06Q 10/10* (2012.01)
*G06K 9/62* (2006.01)
*G06N 3/04* (2006.01)
*G06N 3/08* (2006.01)

(52) U.S. Cl.

CPC ........... *G06Q 10/10* (2013.01); *G06K 9/6267* (2013.01); *G06N 3/04* (2013.01); *G06N 3/08* (2013.01); *G06Q 40/08* (2013.01)

(58) Field of Classification Search

CPC .......... G06Q 10/10; G06Q 40/08; G06N 3/04; G06N 3/08; G06K 9/6267
USPC .............................................................. 705/4
See application file for complete search history.

(56) References Cited

U.S. PATENT DOCUMENTS

| | | | |
|---|---|---|---|
| 8,411,930 B2 | 4/2013 | Ridley et al. | |
| 10,511,676 B2 | 12/2019 | Howe et al. | |
| 2017/0293894 A1* | 10/2017 | Taliwal | G06K 9/00671 |
| 2018/0260793 A1* | 9/2018 | Li | G06T 7/001 |
| 2019/0095877 A1 | 3/2019 | Li | |

* cited by examiner

*Primary Examiner* — Lindsay M Maguire
(74) *Attorney, Agent, or Firm* — Ryan, Mason & Lewis, LLP

(57) ABSTRACT

Methods, apparatus, and processor-readable storage media for automatic processing of claims using artificial intelligence are provided herein. An example computer-implemented method includes obtaining at least one image related to at least one device damage claim, automatically classifying the at least one device damage claim by applying one or more artificial intelligence techniques to the at least one obtained image, and performing one or more automated actions based at least in part on the classification of the at least one device damage claim.

20 Claims, 6 Drawing Sheets

```
#Convolutional Neural Network

#Importing Keras Libraries and packages
from keras.models import Sequential
from keras.layers  import Convolution2D
from keras.layers  import MaxPooling2D
from keras.layers  import Flatten
from keras.layers  import Dense

#Initialize CNN
classifier = Sequential ()

#Convolution Layer
classifier.add(Convolution2D(32, 3, 3, input_shape = 64, 64, 3),
                             activation = 'relu'))
#Pooling Layer
classifier.add(MaxPooling2D(pool_size = (2,2)))

#Flattening the matrix before passing to Neural Network
classifier.add(Flatten())

#Fully Connected Layer (2 layer Neural Network)
classifier.add(Dense(output_dim = 128, activation = 'relu'))
classifier.add(Dense(output_dim = 3, activation = 'softmax')

#Compiling the CNN
classifier.compile(optimizer = 'admin', ,loss = 'binary_crossentropy',
                   metrics = ['accuracy'])

#Fitting CNN to the training data images
from keras.preprocessing.image import ImageDataGenerator

train_datagen = ImageDataGenerator(
                   rescale=1./255,
                   shear_range=0.2,
                   zoom_range=0.2,
                   horizontal_flip=True)

test_datagen = ImageDataGenerator(rescale=1./255)

training_set = train_datagen.flow_from_directory(
                   'data/image_training_set',
                   target_size(64, 64),
                   batch_size=32,
                   class_mode='categorical')
test_set = test_datagen.flow_from_directory()
                   'data/image_test_set',
                   target_size(64, 64),
                   batch_size=32,
                   class_mode='categorical')
```

```
#Training model with data
from IPython.display import display
from PIL import Image

classifier.fit_generator(
            training_set,
            steps_per_epoch=8000,
            epochs=10,
            validation_data=test_set,
            validation_steps=800)

#Testing model with prediction
import numpy as np
from keras.preprocessing import image
test_image = image.load_img('spill.jpg', target_size = (64, 64))
test_image = image.img_to_array(test_image)
test_image = np.expand_dims(test_image, axis = 0)
result = classifier.predict(test_image)
training_set.class_indices
if result[0] [0] >= 0.6:
   prediciton = 'Keyboard Spill'
elif result [0] [0] >= 0.3:
   prediction = 'Cracked LCD'
elif result [0] [0] >= 0.1:
   prediction = 'Fire Damage'
print(prediction)
```

*FIG. 6*

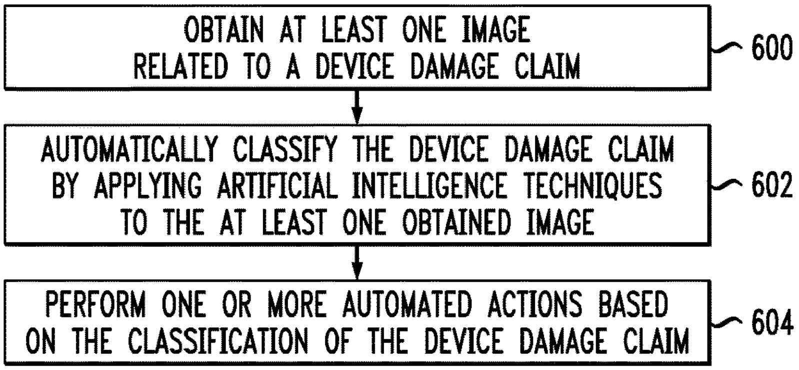

AUTOMATIC PROCESSING OF DEVICE DAMAGE CLAIMS USING ARTIFICIAL INTELLIGENCE

FIELD

The field relates generally to information processing systems, and more particularly to image processing techniques in such systems.

BACKGROUND

Device damage claims (e.g., accidental damage claims) generally contain images of damaged hardware and/or other device components taken by users of the devices using mobile and/or digital cameras. However, conventional damage remediation and/or management techniques typically require significant and time-intensive human efforts to validate such damage claims by manually comparing various images. Such manual processes often result in human errors, increased processing times, and decreased user satisfaction levels.

SUMMARY

Illustrative embodiments of the disclosure provide techniques for automatic processing of device damage claims using artificial intelligence (AI). An exemplary computer-implemented method includes obtaining at least one image related to at least one device damage claim, automatically classifying the at least one device damage claim by applying one or more AI techniques to the at least one obtained image, and performing one or more automated actions based at least in part on the classification of the at least one device damage claim.

Illustrative embodiments can provide significant advantages relative to conventional damage remediation and/or management techniques. For example, challenges associated with human errors and increased processing times are overcome in one or more embodiments through implementing AI-based image recognition techniques to automate damage claim processing, reduce support lifecycle times, and/or reduce repeat dispatches resulting from incorrect damage diagnoses caused by human error.

These and other illustrative embodiments described herein include, without limitation, methods, apparatus, systems, and computer program products comprising processor-readable storage media.

BRIEF DESCRIPTION OF THE DRAWINGS

FIG. 4 shows example pseudocode for an example CNN with example training data in an illustrative embodiment.

FIG. 5 shows example pseudocode for generating damage-related predictions using an example CNN in an illustrative embodiment.

FIG. 6 is a flow diagram of a process for automatic processing of claims using AI in an illustrative embodiment.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
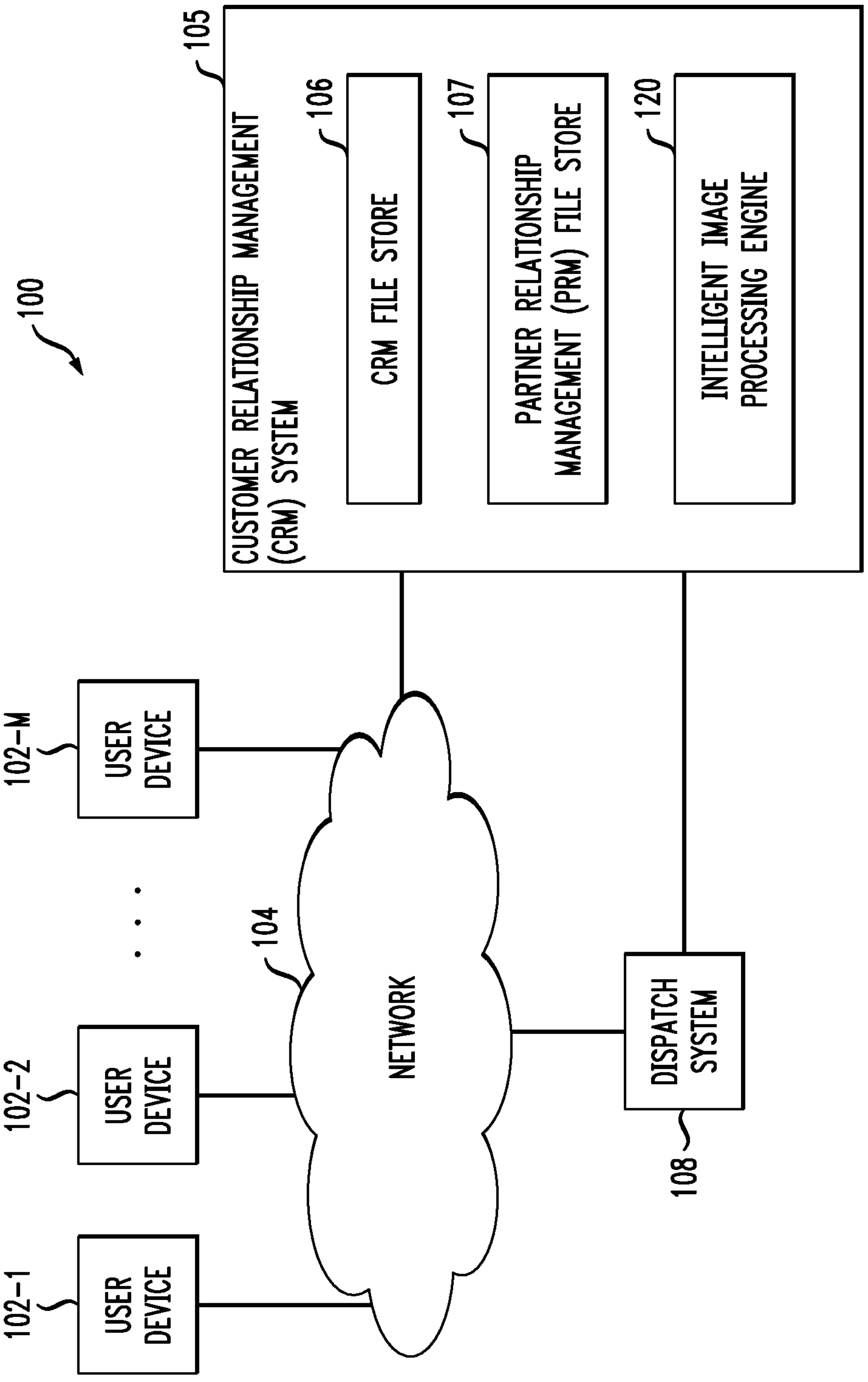
FIG. 1 shows an information processing system configured for automatic processing of claims using AI in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is dispatch system 108 and customer relationship management (CRM) system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human (e.g., customer), hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As also illustrated via FIG. 1, the CRM system 105 includes a CRM file store 106 configured to store customer-provided image files (e.g., images of damaged device components provided in connection with damage claims). The CRM system 105 further includes a partner relationship management (PRM) file store 107 configured to store product images (e.g., new and/or default images of un-damaged devices and/or products).

The CRM file store 106 and PRM file store 107 in one or more embodiments can be implemented using one or more storage systems associated with the CRM system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

As also noted above, dispatch system 108 is coupled to network 104 as well as to CRM system 105. As used herein, dispatch system 108 includes a system for dispatching a damaged device component replacement and/or labor resources (e.g., a field technician) to a user (or user device) location in connection with a device damage claim.

The CRM system 105 in the FIG. 1 embodiment is assumed to be implemented using at least one processing device. Each such processing device generally comprises at least one processor and an associated memory, and implements one or more functional modules for controlling certain features of the CRM system 105.

More particularly, the CRM system 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface allows the CRM system 105 to communicate over the network 104 with the user devices 102 and/or dispatch system 108, and illustratively comprises one or more conventional transceivers.

As also illustrated in FIG. 1, the CRM system 105 additionally comprises an intelligent image processing engine 120, described in further detail herein.

It is to be appreciated that this particular arrangement of modules 106, 107 and 120 illustrated in the CRM system 105 of the FIG. 1 embodiment is presented by way of example only, and alternative arrangements can be used in other embodiments. For example, the functionality associated with the modules 106, 107 and 120 in other embodiments can be combined into a single module, or separated across a larger number of modules. As another example, multiple distinct processors can be used to implement different ones of the modules 106, 107 and 120 or portions thereof.

At least portions of the modules 106, 107 and 120 may be implemented at least in part in the form of software that is stored in memory and executed by a processor.

It is to be understood that the particular set of elements shown in FIG. 1 for automatic processing of claims using artificial intelligence involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 106, 107 and 120 of an example CRM system 105 in computer network 100 will be described in more detail with reference to the flow diagram of FIG. 6.

As noted herein, damage claims (e.g., accidental damage claims) from customers generally contain images (taken via one or more user devices) of damaged hardware parts and/or components, which are provided by the customers to support the damage claims. Such claims can be categorized across various devices (e.g., laptop computers, desktop computers, tablets, smart phones, etc.) with respect to damage type, wherein such example categories might include battery damage, broken hinge(s), broken key(s), charger damage, cracked cover, cracked keyboard, cracked liquid crystal display (LCD), cracked LCD bezel, cracked palm rest, cracked plastic(s), damaged power button, damaged display, damaged headphone jack, damage related to liquid spills, missing key(s), damage related to a dropped device, universal serial bus (USB) port damage, cover damage, etc.

At least one embodiment includes automating processing of such claims using machine learning image recognition and classification techniques to determine the authenticity of any damage, the severity of any damage (e.g., low severity, medium severity, high severity), the type of damage (e.g., the parts and/or components involved in the claim), etc. Such an embodiment includes leveraging deep learning techniques and/or one or more neural networks (e.g., one or more CNNs) for automatically analyzing image and/or video data, automatically performing device damage pattern matching, and automatically classifying damage claims in connection with the image processing (e.g., providing damage authenticity, damage identity, and damage severity determinations).

Figure 2:
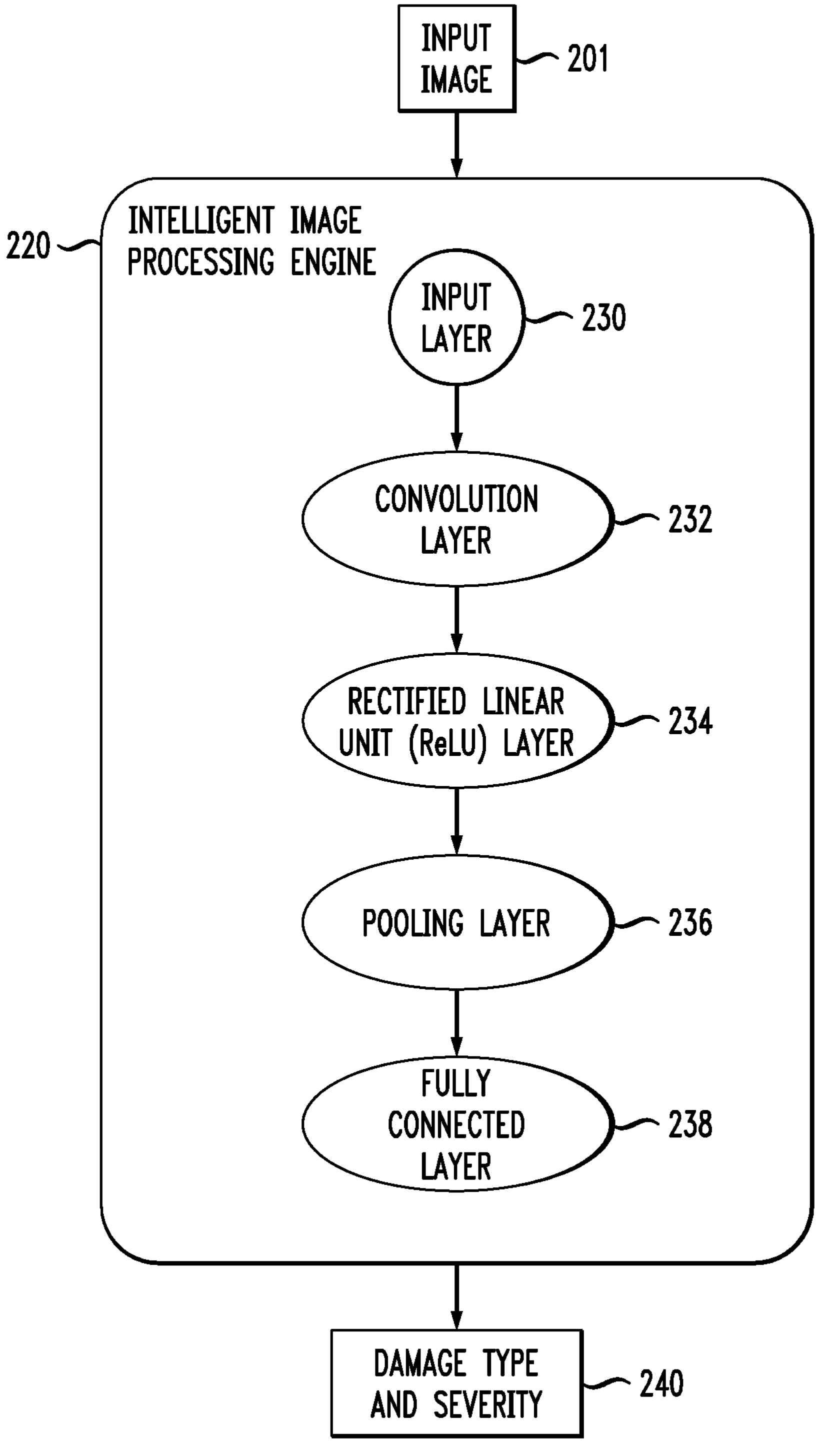
FIG. 2 shows an example implementation of an intelligent image processing engine using a convolutional neural network (CNN) in an illustrative embodiment.

FIG. 2 shows an example implementation of intelligent image processing engine 220 using a CNN in an illustrative embodiment. By way of illustration, FIG. 2 depicts an input image 201 being provided to and processed by intelligent image processing engine 220, which ultimately products and outputs a classification 240 pertaining to damage type and severity. Processing of the input image 201 by the intelligent image processing engine 220 includes passing the input image 201 through a series of layers of at least one CNN, wherein the series of layers includes an input layer 230, a convolutional layer 232, a rectified linear unit (ReLU) layer 234, a pooling layer 236, and a fully connected layer 238.

More specifically, the input image 201 (e.g., a matrix with pixel values) is entered into the input layer 230. The input image values can be, for example, in color (e.g., RGB) or grey scale; accordingly, the pixel values in a corresponding matrix can vary between 0 and 255 for color, or between 0 and 1 for grayscale. With respect to passing the input image 201 to the convolution layer 232, scanning of the input image 201 begins, in one or more embodiments, at the top-left pixel of the corresponding matrix. At least one embodiment can include selecting a smaller matrix, referred to herein as a filter (or neuron, or core), wherein the filter scans through the original image matrix in a process called convolution. While scanning through the image, the filter multiplies its values by the original pixel values. These multiplications are then summed up to calculate one value. In such an embodiment, because the filter starts in the top-left corner pixel, the filter moves further and further right by one unit (also referred to as a stride), performing a similar operation upon each one-unit move. After passing the filter across all positions of the image, a matrix is generated and/or obtained which is smaller than the input image matrix. Accordingly, such an embodiment includes condensing the input image 201 while maintaining one or more image features. Also, the stride and the size of the filter can be determined, for example, via at least one learning model associated with the CNN, and as such, the stride and the size of the filter can vary over time.

Passing the input image 201 through the ReLU layer 234 includes a complementary process to the actions performed by the convolution layer 232, wherein the complementary process increases non-linearity of the image by removing negative values of the image and activating at least one neuron. Such a process can also include at least one function similar to a Sigmoid function that facilitates a binary classification. By way of illustration, in a neural network, weights utilized can be positive and/or negative. For example, in one or more embodiments, a ReLU activation function (e.g., f(x)=max(0, x)), during a computation step, sets negative weight values to 0.0. This can be carried out, for example, to improve the neural network by accelerating the training process.

With respect to the pooling layer 236, the condensed image is further down-sampled in both height and width by using at least one max-pooling technique. Such a max-pooling technique includes taking the maximum value of a matrix and further reducing the dimensionality while retaining a corresponding feature map. By way merely of example, at least one embodiment can include adopting a 2×2 filter with a stride value of two during a pooling process.

With respect to the fully connected layer 238, the already compressed matrix is flattened, converted to an n-dimensional vector, and connected to at least one neural network (such as further detailed in connection with FIG. 3). By way of example, one or more embodiments include using two layers (e.g., previous layers in the series of layers) of a neural network with a SoftMax activation function for multinomial (e.g., more than two variables) classification of the input image. As noted above and depicted in FIG. 2, such a classification 240 can encompass damage type and damage severity determinations.

Figure 3:
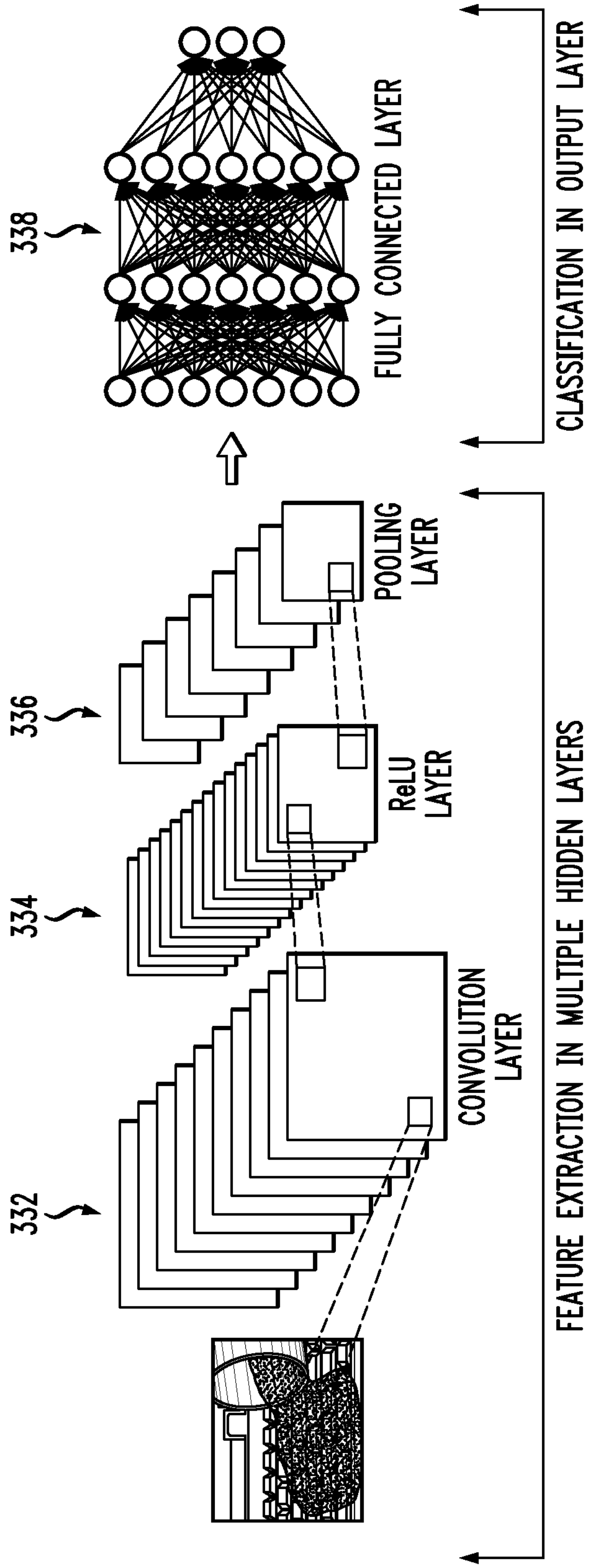
FIG. 3 shows an example process of classifying an image using a CNN in an illustrative embodiment.

FIG. 3 shows an example process of classifying an image using a CNN in an illustrative embodiment. By way of illustration, FIG. 3 depicts feature extraction (from an input image) using multiple hidden layers of the CNN, and classification (of the input image) using an output layer of the CNN. More specifically, the feature extraction process illustrated in FIG. 3 includes passing an input image through convolution layer 332, ReLU layer 334, and pooling layer 336 of the CNN, while the classification process includes passing the output of the feature extraction processing through fully connected layer 338 (which includes at least one neural network).

FIG. 4 shows example pseudocode for an example CNN with example training data in an illustrative embodiment. In this embodiment, pseudocode 400 is executed by or under the control of a processing platform, such as CRM system 105, or another type of processing platform. For example, the pseudocode 400 may be viewed as comprising a portion of a software implementation of at least part of the intelligent image processing engine 120 of the FIG. 1 embodiment.

As detailed in pseudocode 400, Keras libraries are imported and the CNN classifier model is initialized (e.g., creating a model with a linear stack of layers) using a sequential Keras from a Keras model library (i.e., classifier=Sequential( )). The convolution layer is added to the classifier, which creates the first layer of the neural network (i.e., classifier.add(Conv2D(32, (3, 3), input_shape=(64, 64, 3), activation='relu'))). As noted in pseudocode 400, this function adds a filter dimensionality of 32 (i.e., the number of output filters in the convolution layer) and a filter size of 3×3. Also, the activation function as ReLU is provided in the function as a parameter. Further, the pooling layer is added to the classifier with a pool size of 2, 2 to downscale the image (i.e., classifier.add(MaxPooling2D (2, 2))).

As also detailed in pseudocode 400, the image matrix needs to be flattened (e.g., to a single dimension) before being passed to the neural network by adding a flatten function to the classifier (i.e., classifier.add(Flatten( ))). Additionally, two layers of the neural network are added to the model classifier with the first layer using the ReLU function and the second layer using a SoftMax activation function (i.e., classifier.add(Dense(output_dim=128, activation='rel')) and classifier.add(Dense(output_dim=3, activation='softmax'))).

Further, as noted in pseudocode 400, the CNN classifier with all of the layers added is first compiled with an optimizer selected as a gradient-based optimizer algorithm for stochastic objective functions (i.e., classifier.compile (optimizer='admin', loss='binary_crossentropy', metrics=[' accuracy'])). Training and testing datasets are then created with images from an image data generator.

It is to be appreciated that this particular pseudocode shows just one example implementation of an example CNN with example training data, and alternative implementations of the process can be used in other embodiments.

FIG. 5 shows example pseudocode for generating damage-related predictions using an example CNN in an illustrative embodiment. In this embodiment, pseudocode 500 is executed by or under the control of a processing platform, such as CRM system 105, or another type of processing platform. For example, the pseudocode 500 may be viewed as comprising a portion of a software implementation of at least part of the intelligent image processing engine 120 of the FIG. 1 embodiment.

As detailed in pseudocode 500, a CNN model is trained using a training dataset by calling a fit_generator function (i.e., classifier.fit_generator(training_set . . . )). The model is tested using an image (e.g., the image that is sent by the user or user device) to predict the classification of the image. Typically, a CNN predicts multiple classifications with a varying degree of accuracy. In the case of a binary classification, the result value can be either 0 or 1. However, in case of multi-classification, result values can vary between 0 and 1. As detailed in example pseudocode 500, based on the result value, the prediction classification is either a keyboard spill, a cracked LCD or fire damage.

It is also to be appreciated that this particular pseudocode shows just one example implementation of a process for generating damage-related predictions using an example CNN, and alternative implementations of the process can be used in other embodiments.

FIG. 6 is a flow diagram of a process for automatic processing of claims using artificial intelligence in an illustrative embodiment. It is to be understood that this particular process is only an example, and additional or alternative processes can be carried out in other embodiments.

In this embodiment, the process includes steps 600 through 604. These steps are assumed to be performed by the intelligent image processing engine 120.

Step 600 includes obtaining at least one image related to at least one device damage claim.

Step 602 includes automatically classifying the at least one device damage claim by applying one or more artificial intelligence techniques to the at least one obtained image. In one or more embodiments, applying the one or more artificial intelligence techniques to the at least one obtained image includes applying one or more deep learning techniques and/or applying at least one neural network to the at least one obtained image. Alternatively, in one or more embodiments, applying the neural network to an image can comprise, for example, providing the image as an input to the neural network. The at least one neural network can include, for example, at least one convolutional neural network.

Additionally, in at least one embodiment, applying the at least one neural network to the at least one obtained image includes passing the at least one obtained image through a series of layers of the at least one neural network. In such an embodiment, the series of layers of the at least one neural network includes two or more of at least one convolutional layer, at least one rectified linear unit layer, at least one pooling layer, and at least one fully connected layer. Also, in one or more embodiments, the series of layers of the at least one neural network further includes at least one input layer.

Automatically classifying the at least one device damage claim can include determining at least one type of device damage corresponding to the at least one device damage claim. Additionally or alternatively, automatically classifying the at least one device damage claim can include determining at least one level of damage severity corresponding to the at least one device damage claim.

Step 604 includes performing one or more automated actions based at least in part on the classification of the at least one device damage claim. Performing the one or more automated actions can include automatically remediating at least a portion of the at least one device damage claim and/or outputting the classification of the at least one device damage claim to a dispatch system for use in connection with one or more remediation actions. Automatic remediation can include, for example, automatically facilitating part replacement(s) and/or labor support.

The techniques depicted in FIG. 6 can also include training the one or more artificial intelligence techniques using categorized historical images of damaged device components (for example, damaged hardware and/or other damaged device components).

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to augment CRM systems with AI-based image recognition capability. These and other embodiments can effectively reduce device damage claim processing support costs, improve customer service, and reduce repeat dispatches resulting from incorrect diagnoses of damage due to human error.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
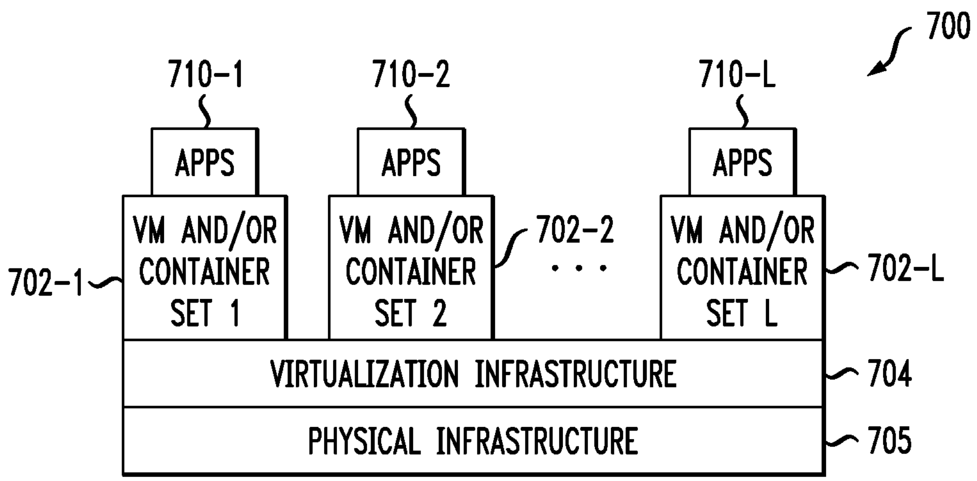
FIGS. 7 and 8 show examples of processing platforms that may be utilized to implement at least a portion of an information processing system in illustrative embodiments.
Figure 8:
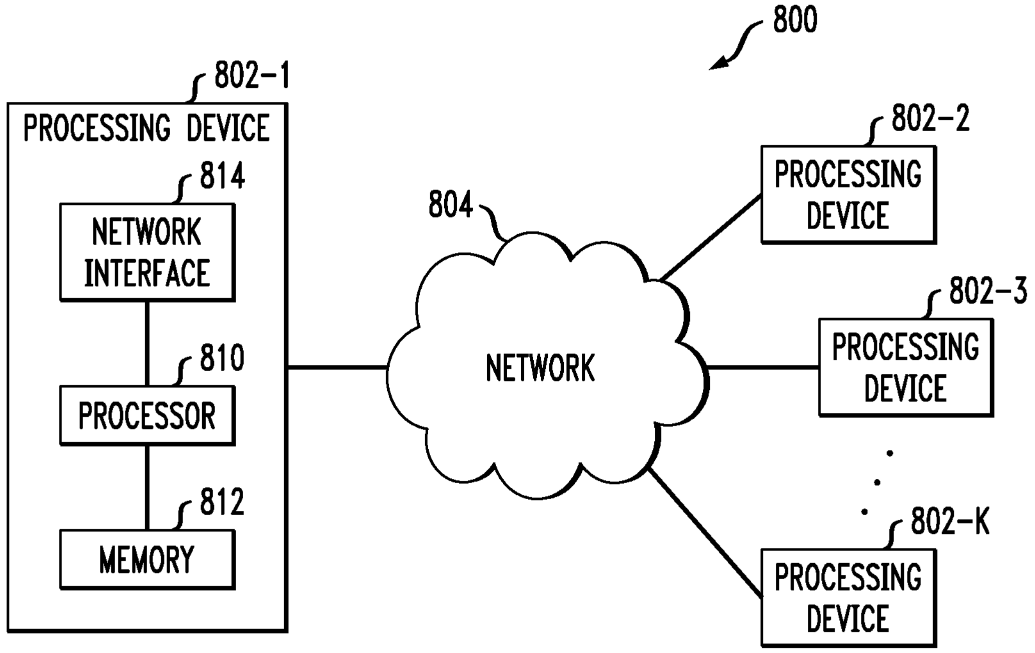

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, systems and devices deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining at least one image related to at least one device damage claim;

automatically classifying the at least one device damage claim by applying one or more artificial intelligence techniques to the at least one obtained image, wherein applying the one or more artificial intelligence techniques to the at least one obtained image comprises:

determining a filter by selecting a sub-portion of the at least one obtained image;

scanning, using the filter, the at least one obtained image in accordance with a variable stride;

multiplying, in conjunction with the scanning of the at least one obtained image using the filter, one or more values of the filter using one or more pixel values derived from the at least one obtained image;

generating a filter value by summing the one or more multiplied values of the filter; and condensing the at least one obtained image based at least in part of the generated filter value;

performing one or more automated actions based at least in part on the classification of the at least one device damage claim; and training the one or more artificial intelligence techniques using categorized historical images of damaged device components and by modifying negative weight values, utilized as part of the one or more artificial intelligence techniques, to zero;

wherein the method is performed by at least one processing device comprising a processor coupled to a memory.

2. The computer-implemented method of claim 1, wherein applying the one or more artificial intelligence techniques to the at least one obtained image comprises applying at least one neural network to the at least one obtained image.

3. The computer-implemented method of claim 2, wherein the at least one neural network comprises at least one convolutional neural network.

4. The computer-implemented method of claim 2, wherein applying the at least one neural network to the at least one obtained image comprises passing the at least one obtained image through a series of layers of the at least one neural network.

5. The computer-implemented method of claim 4, wherein the series of layers of the at least one neural network comprises two or more of: at least one convolutional layer, at least one rectified linear unit layer, at least one pooling layer, and at least one fully connected layer.

6. The computer-implemented method of claim 5, wherein the series of layers of the at least one neural network further comprises at least one input layer.

7. The computer-implemented method of claim 1, wherein applying the one or more artificial intelligence techniques to the at least one obtained image comprises applying one or more deep learning techniques to the at least one obtained image.

8. The computer-implemented method of claim 1, wherein automatically classifying the at least one device damage claim comprises determining at least one type of device damage corresponding to the at least one device damage claim.

9. The computer-implemented method of claim 1, wherein automatically classifying the at least one device damage claim comprises determining at least one level of damage severity corresponding to the at least one device damage claim.

10. The computer-implemented method of claim 1, wherein performing the one or more automated actions comprises automatically remediating at least a portion of the at least one device damage claim.

11. The computer-implemented method of claim 1, wherein performing the one or more automated actions comprises outputting the classification of the at least one device damage claim to a dispatch system for use in connection with one or more remediation actions.

12. A non-transitory processor-readable storage medium having stored therein program code of one or more software programs, wherein the program code when executed by at least one processing device causes the at least one processing device:

to obtain at least one image related to at least one device damage claim;

to automatically classify the at least one device damage claim by applying one or more artificial intelligence techniques to the at least one obtained image, wherein applying the one or more artificial intelligence techniques to the at least one obtained image comprises:

determining a filter by selecting a sub-portion of the at least one obtained image;

scanning, using the filter, the at least one obtained image in accordance with a variable stride;

multiplying, in conjunction with the scanning of the at least one obtained image using the filter, one or more values of the filter using one or more pixel values derived from the at least one obtained image;

generating a filter value by summing the one or more multiplied values of the filter; and condensing the at least one obtained image based at least in part of the generated filter value;

to perform one or more automated actions based at least in part on the classification of the at least one device damage claim; and to train the one or more artificial intelligence techniques using categorized historical images of damaged device components and by modifying negative weight values, utilized as part of the one or more artificial intelligence techniques, to zero.

13. The non-transitory processor-readable storage medium of claim 12, wherein applying the one or more artificial intelligence techniques to the at least one obtained image comprises applying at least one neural network to the at least one obtained image.

14. The non-transitory processor-readable storage medium of claim 13, wherein applying the at least one neural network to the at least one obtained image comprises passing the at least one obtained image through a series of layers of the at least one neural network.

15. The non-transitory processor-readable storage medium of claim 14, wherein the series of layers of the at least one neural network comprises two or more of: at least one convolutional layer, at least one rectified linear unit layer, at least one pooling layer, and at least one fully connected layer.

16. An apparatus comprising:

at least one processing device comprising a processor coupled to a memory;

the at least one processing device being configured:

to obtain at least one image related to at least one device damage claim;

to automatically classify the at least one device damage claim by applying one or more artificial intelligence techniques to the at least one obtained image, wherein applying the one or more artificial intelligence techniques to the at least one obtained image comprises:

determining a filter by selecting a sub-portion of the at least one obtained image;

scanning, using the filter, the at least one obtained image in accordance with a variable stride;

multiplying, in conjunction with the scanning of the at least one obtained image using the filter, one or more values of the filter using one or more pixel values derived from the at least one obtained image;

generating a filter value by summing the one or more multiplied values of the filter; and condensing the at least one obtained image based at least in part of the generated filter value;

to perform one or more automated actions based at least in part on the classification of the at least one device damage claim; and to train the one or more artificial intelligence techniques using categorized historical images of damaged device components and by modifying negative weight values, utilized as part of the one or more artificial intelligence techniques, to zero.

17. The apparatus of claim 16, wherein applying the one or more artificial intelligence techniques to the at least one obtained image comprises applying at least one neural network to the at least one obtained image.

18. The apparatus of claim 17, wherein applying the at least one neural network to the at least one obtained image comprises passing the at least one obtained image through a series of layers of the at least one neural network.

19. The apparatus of claim 18, wherein the series of layers of the at least one neural network comprises two or more of: at least one convolutional layer, at least one rectified linear unit layer, at least one pooling layer, and at least one fully connected layer.

20. The apparatus of claim 17, wherein performing the one or more automated actions comprises automatically remediating at least a portion of the at least one device damage claim.

* * * * *

UNITED STATES PATENT AND TRADEMARK OFFICE

CERTIFICATE OF CORRECTION

PATENT NO. : 11,138,562 B2
APPLICATION NO. : 16/745541
DATED : October 5, 2021
INVENTOR(S) : Devipriya Selvaraju et al.

It is certified that error appears in the above-identified patent and that said Letters Patent is hereby corrected as shown below:

In the Claims

In Claim 1, Column 11, Lines 39-40, replace:
"condensing the at least one obtained image based at least in part of the generated filter value;"
With:
-- condensing the at least one obtained image based at least in part on the generated filter value; --

In Claim 12, Column 12, Lines 53-54, replace:
"condensing the at least one obtained image based at least in part of the generated filter value;"
With:
-- condensing the at least one obtained image based at least in part on the generated filter value; --

In Claim 16, Column 14, Lines 3-4, replace:
"condensing the at least one obtained image based at least in part of the generated filter value;"
With:
-- condensing the at least one obtained image based at least in part on the generated filter value; --

In Claim 20, Column 14, Lines 27-30, replace:
"The apparatus of claim 17, wherein performing the one or more automated actions comprises automatically remediating at least a portion of the at least one device damage claim."
With:
-- The apparatus of claim 16, wherein performing the one or more automated actions comprises automatically remediating at least a portion of the at least one device damage claim. --

Signed and Sealed this
Twelfth Day of December, 2023

Katherine Kelly Vidal
*Director of the United States Patent and Trademark Office*